July 23, 1940.  W. VAN DER SLUYS  2,208,650
RAILWAY VEHICLE
Filed July 12, 1937  3 Sheets-Sheet 1
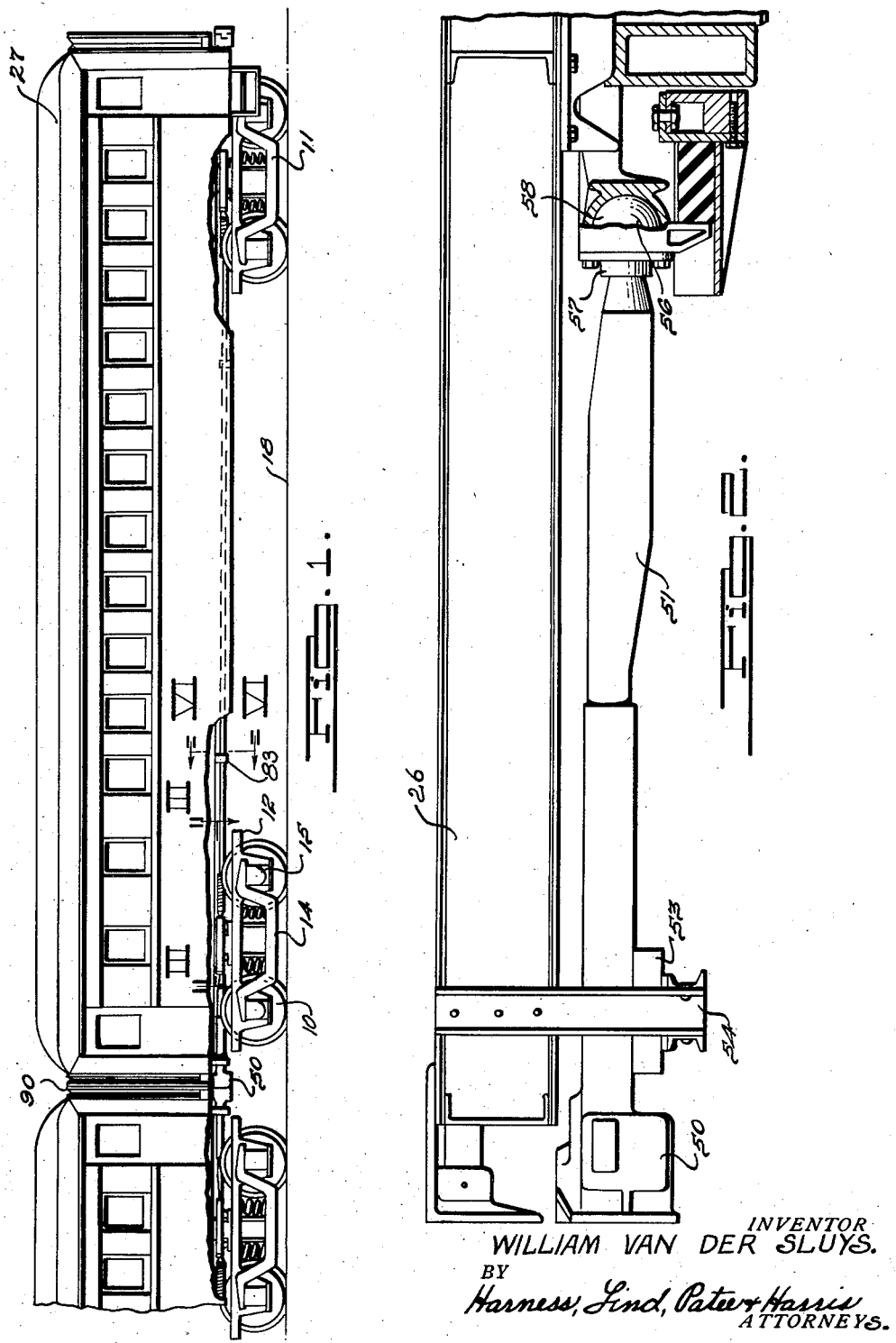
INVENTOR
WILLIAM VAN DER SLUYS.
BY
Harness, Lind, Pater + Harris
ATTORNEYS.

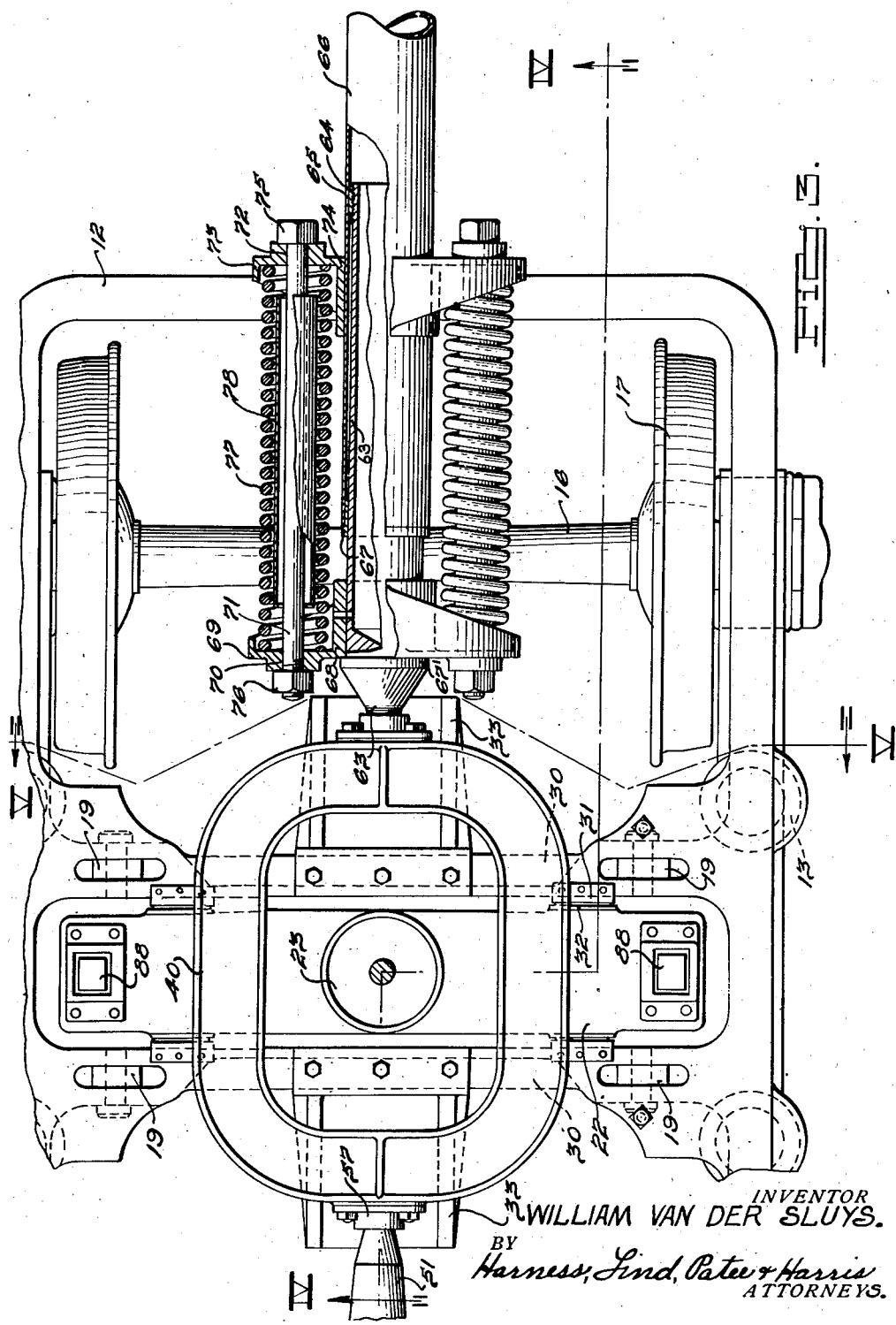

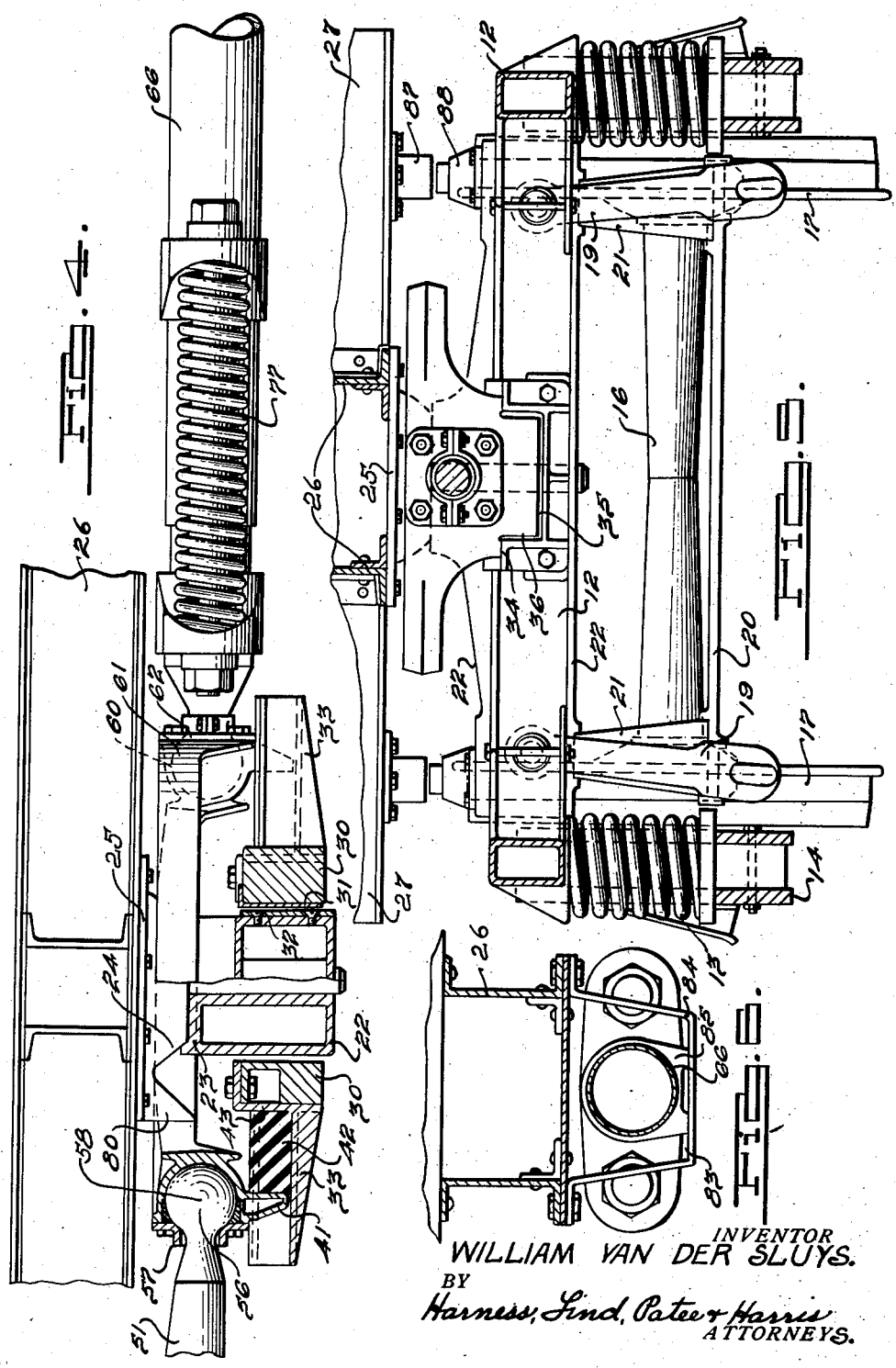

Patented July 23, 1940

2,208,650

UNITED STATES PATENT OFFICE 2,208,650

RAILWAY VEHICLE

William Van Der Sluys, Detroit, Mich., assignor to Chrysler Corporation, Highland Park, Mich., a corporation of Delaware Application July 12, 1937, Serial No. 153,191

11 Claims. (Cl. 105—454)

My invention relates to vehicles and it has particular relation to vehicles which are to be adapted to be connected together and pulled in trains over tracks for the transportation of passengers and merchandise.

At the present time, in railroad trains, it is necessary that each car serve as a means of transmitting forces, both tensional and compressional, from the engine or joining cars to all the cars connected to its opposite end. As it is customary to transmit such forces through the bodies of the cars, this places each car body under a strain, especially when the train is being pushed or pulled around a curve in the track, which prevents freedom of movement of that car body on its springs and causes any disturbing forces arising throughout the train to be exerted on adjacent car bodies until dissipated by friction.

One object of my invention is to eliminate, as far as possible, the use of the car bodies as a means for transmitting forces throughout the trains, thus leaving the bodies free to move on their springs and permitting accurate designing of springs especially adapted for the specific car body in question, in order to provide improved riding qualities.

A further object of my invention consists in providing means whereby all tensional forces and all moderate compressional forces are transmitted through the vehicle independently of the car body and wherein the car body is employed as a force transmitting means only when the vehicle is subjected to relatively high compressive forces.

A further object of my invention consists in providing means for transmitting forces of either compressional or tensional nature through the train consisting of draft mechanism floatingly mounted on the individual vehicles and associated with the individual vehicles through resilient cushioning means.

For a better understanding of my invention reference may now be had to the accompanying drawings, in which:

Fig. 1 is a side elevational view of one complete railroad passenger car and a portion of a second car, both having my invention incorporated therein.

Fig. 2 is a side view, partially in elevation and partially in cross-section, illustrating the connection of the drawbar and associated car coupling to the draft mechanism.

Fig. 3 is a plan view, partially in cross-section, of a portion of a truck constructed in accordance with my invention, the view being taken along the lines III—III of Fig. 1.

Fig. 4 is a vertical cross-sectional view of a portion of the structure illustrated in Fig. 3, the section being taken along the line IV—IV thereof.

Fig. 5 is a vertical transverse cross-sectional view of the structure illustrated in Fig. 3, the section being taken along the line V—V thereof.

Fig. 6 is a cross-sectional view, taken in vertical transverse section of a portion of the structure illustrated in Fig. 1, the section being taken along the line VI—VI thereof.

In the drawings I have illustrated a railway passenger car provided with two spaced trucks 10 and 11, each provided with a truck frame 12 which rests upon coiled compression springs 13 which, in turn, rest upon two adjacently disposed equalizer bars 14, the ends of which rest upon wheel journals 15, operatively associated with car axles 16, on which are mounted wheels 17, adapted to roll on rails 18. Swing links 19 are pivotally secured to the frame member 12 and support, at their other ends, a spring plank 20. Spring plank 20 supports two pedestals 21, one at each end thereof, on the upper ends of which are supported a truck bolster member 22.

Centrally disposed on the truck bolster member 22, on its top surface, is a center bearing 23 on which rests a cooperating center bearing member 24, secured to a car bolster member 25, which, in turn, is secured to a main central beam 26 extending longitudinally of a car body 27. By means of the center bearings 23, 24, the trucks 10 and 11 may rotate with respect to the car body in passing around curves in the track. The swing links 19 serve to permit a relatively small amount of lateral motion of the trucks with respect to the car body, or vice versa, thus preventing the transmission to the car body of each slight lateral irregularity in the railroad tracks.

The truck frame 12 is provided, adjacent its longitudinal center, with two spaced parallel transversely extending supporting girders 30, commonly known as transoms, which extend longitudinally of the bolster member 22 and are normally spaced slightly therefrom. The transom members 30 are provided with the usual wear plates 31 adapted to be engaged by cooperating wear plates 32 mounted on the bolster 22 to prevent excessive longitudinal motion of the bolster with respect to the truck frame.

The transoms 30 are provided with two oppositely disposed laterally extending projecting members 33, one of which is mounted on each of the transoms 30. The members 33 are provided at each side with a raised edge portion 34 and a central depressed portion 35 which are connected together by vertical side walls 36, as best shown in Fig. 5. Resting upon the horizontal raised edge portions 34 is a yoke member 40 which is substantially rectangular in plan and is normally disposed centrally of the truck frame 12. Being hollow in construction, it encompasses the center bearing 23 which is likewise disposed centrally of the truck frame 12. The yoke member 40 is provided with two downwardly extending arms 41 which extend into the depressed portion or channel 35 of the guide member 33, and rubber blocks 42 are disposed intermediate the downwardly extending arms 41 and a vertical face 43 of the guide member 33. These rubber blocks 42 serve to resiliently maintain the yoke member 40 in a central position with respect to the transoms 30 and center bearing 23, but nevertheless permit longitudinal movement of the yoke member 40 with respect to the truck frame 12 and car body 27 by compressing or permitting expansion of the rubber blocks 42 on either side of the transoms 30. The downwardly projecting portions 41 are slightly narrower than the space between the side walls 36 on the guide members 33, thus preventing material lateral motion of the yoke member 40 with respect to the truck frame 12.

As best illustrated in Fig. 2, a car coupling device 50, preferably of the rigid or tight-locked type construction, is secured to the end of a drawbar 51, the coupling member 50 being supported slidably upon a block 53 supported by means of a customary downwardly extending girder 54 mounted on the longitudinally extending beam 26 constituting the back bone or supporting structure of the car body 27. The block 53 is of sufficient width to permit considerable lateral movement of the coupling and drawbar with respect to the car body as the train passes around curves in the track. The drawbar 51 is provided at its opposite end with a spherical member 56, enclosed within a collar 57, which is adapted to be bolted or otherwise suitably secured to the external side of the yoke member 40 in such a manner that the spherical end 56 fits into a semispherical recess 58 disposed in the end of the yoke member 40 and is retained within that recess by means of the collar 57, thus forming a ball and socket joint between the drawbar 51 and the end portion of the yoke member 40.

In like manner, the opposite end of the yoke 40 is provided with a semi-spherical recess 60 within which is disposed a spherical member 61, which is held in position therein by a similar collar 62, bolted or otherwise secured to the end of the yoke member. The spherical member 61 is mounted on the end of the tube 63, which is of hollow construction, and the opposite end of which is threaded, as shown at 64, in order to threadedly engage a surrounding collar member 65. A second relatively long tubular member 66 encloses the end of the tube 63 and slidably engages the collar 65 so as to constitute therewith a collapsible beam member. The end of the tube 66 is provided with a collar member 67 which closely engages the outer surface of the tube 63 and slides thereon with the tube 66, thus providing a sliding bearing and preventing the admission of dirt or other foreign matter to the sliding joint between the two tubes.

The tube 63 is provided at its end adjacent the yoke member with a shoulder 67' against which rests a collar member 68 which is pinned or otherwise rigidly secured to the tube member 63. The collar 68 is provided with two laterally extending arms 69, each of which is provided with an opening 70 through which extends a bolt or rod 71. The rod 71 extends, at its other end, through an opening 72 in a laterally extending arm 73 secured to a collar member 74, which is pinned or otherwise rigidly secured, to the tubular beam 66. The rod 71 is provided at one end with a head 75 and at the other end with a nut 76 so that it may be adjusted as to length and so as to prevent separation of the collar members 68 and 74 beyond predetermined positions, but so as to permit their movement toward each other from that predetermined position. Surrounding the rod 70, and in engagement with each of the arms 69 and 73, is a coiled spring 77 which is maintained under pressure at all times by proper adjustment of the nut 76 on the bolt 71. Disposed within the coiled spring 77 and surrounding the bolt 71 is a hollow sleeve member 78 which serves to maintain the individual convolutions of the spring 77 in proper alignment.

The tubular beam 66 extends rearwardly from the front truck to the rear truck and is secured thereto by a corresponding construction of shock absorbing member and yoke member, thus providing an arrangement wherein the yoke members of the two trucks may move toward each other by compressing the springs 77 at both ends of the vehicle, but which are prevented by the bolts 71 from moving away from each other beyond predetermined positions. As a result, any tension placed on the yoke member 40 through the coupling 50 and drawbar 51 will be transmitted directly to the yoke member mounted on the rear end of the vehicle and thence to a corresponding drawbar and coupling member at the opposite end thereof to be in turn transmitted to the drawbar mechanism of the next adjacent coach. On the other hand, any compressive forces exerted on the subject car through the coupling mechanism 50 and drawbar 51 will be exerted directly on the yoke member 40 of the front truck and thence transmitted to the collar member 68 from which it is transmitted to the tubular beam 66 through the compression springs 77 and in turn through the compression springs 77 of the rear truck before reaching the yoke of the rear truck, thus permitting a predetermined amount of compressive stress to be transmitted through the tubular beam 66, as determined by the initial compression and rate of springs 77, as well as providing a cushioning effect for compressive stresses. For the foregoing reasons, I have referred to the means for transmitting forces between adjacent cars as being compressible but inextensible in order to provide the previously described qualities.

When any force, either compressive or tensional, is exerted on the yoke member 40 by means of the drawbar 51, it is transmitted partially to the truck frame 12 by compression of either of the two rubber blocks 42, thus serving to start the truck and car body in motion or serving to alter or maintain its motion, depending on the type of force transmitted and the question of whether or not the car is in motion at the time the force is transmitted. The blocks 42 thus provide a cushioning member between the yoke member 40 and the truck frame 12.

In addition, I have provided a rigid stop member or shoulder 80 mounted on the car beam 26 and disposed it within the path of movement of the yoke member 40 in such spaced relation that it will not be engaged by the yoke member 40 until after the rubber block 42 has been compressed to a considerable degree. The stop or shoulder members 80 are mounted only at the two ends of the car and serve to relieve the yokes and tubular beams 66 of excessive stresses in the nature of heavy compressive loads being exerted between the ends of the car. As a result, any heavy compressive force exerted on the subject car through the front drawbar 51 will first compress the block 42, at the same time transmitting the remainder of the force through the coil springs 77 to the next adjacent block 42 of the opposite truck, but in the event of that force being sufficiently great that it compresses the originally compressed block 42 to such a point that the yoke member 40 engages the stop member 80, any additional compressive forces exerted thereby will be transmitted directly to the longitudinal car body beam 26 to move the car body or alter its then existing movement, as the case may be. If, for any reason, the block member 42 at the opposite end of the second truck is severely compressed at the moment, the stop member 80 at that end of the car body will likewise be brought into engagement with the yoke member on that truck and transmit these excessive compressive forces directly to the drawbar 51 at the opposite end of the truck for transmission to adjacent cars.

The springs 77 are designed in conjunction with the beam 66 so that the latter cannot be overloaded. As a result when the compressive forces approach the limit which should be carried by the beam 66 the springs 77 yield and are compressed, thus permitting movement of the two yokes toward each other. When this occurs the rubber member 42 on the front side of the front yoke is compressed to a considerable degree and the yoke engages the shoulder 80 secured to the car body. With the compressed springs 77 transmitting a limited amount of force through the beam 66, the shoulder 80 assumes the balance of the compressive force, thus preventing overloading the beam 66, and transmits that force to the rear yoke through the rear center bearing. If the force so transmitted through the car body is sufficient to compress the rubber block 42 at the rear side of the rear yoke the shoulder 80 at the rear end of the car will engage the rear side of the rear yoke and transmit the excess force thereto directly. In this manner normal compressive loads are transmitted by the springs 77 and compressive loads in excess of normal are transmitted between the yokes directly through the car body.

In like manner, when tension forces are exerted on the front drawbar 51, they are transmitted to the yoke member 40 and directly to the tubular beam 66 but movement of the yoke member 40 forwardly serves to compress with rubber block 42 on the rear side of the front center bearing is placed under compression, thus transmitting the tensional force to the rear truck frame 12 and through it to the car body 27. In the event that the force is sufficiently great that both of the rubber blocks 42 become severely compressed, the rear side of the rear yoke member will engage the stop member 80 on the car body, thus moving the car body forwardly and it through the center bearings will aid in moving the trucks 10 and 11 so as to prevent injurious compression of the blocks 42.

The tubular beam 66 is provided at intervals throughout the length of the car with a supporting structure 83 mounted thereon which engages and supports the tubular member 66 but permits it to slide therein. These supports eliminate the necessity of employing a truck interconnecting beam of any considerable weight, which would be necessary to prevent the bending thereof and a consequent misalignment of forces if such supporting structures were not employed. A relatively light beam may, therefore, be employed as it will be understood from the foregoing description that it is required to carry only those forces that are within the limits for which it was designed, as excessive forces and strains are transmitted through the car body directly.

As illustrated in Fig. 5, I have provided the car body 27 with the usual track members 87 which are adapted to cooperate with corresponding roller members 88 mounted on the bolster 22, the purpose of these devices being to prevent excessive tilting of the car body with respect to the bolster 22 under unusual circumstances, such as passing around curves in the tracks at relatively high speeds, and the like.

In the illustrated embodiment of my invention, I have illustrated the car coupling mechanisms 50 as meeting between the car bodies. I have found it desirable to make the coupling mechanism and drawbars of such length that they prevent the actual engagement of the ends of the car bodies as such engagement always occurs when one of the cars is being subjected to unusual movement, such as passing round the curve in the tracks, and serves to transmit undesirable disturbing forces from one car body to the next adjacent car body. As a result, I prefer to employ a bellows mechanism 90 interconnecting the two cars which is of such construction that it cannot transmit any forces, either lateral or vertical, between adjacent car bodies.

Although I have illustrated but a single form of my invention and have described in detail but a single application thereof, it will be apparent to those skilled in the art that it is not so limited but that various modifications and changes may be effected therein without departing from the spirit of my invention or from the scope of the appended claims.

1. In a railway vehicle, two spaced trucks each provided with a frame, a car body pivotally mounted on said trucks, and means interconnecting said trucks comprising a yoke member longitudinally slidably mounted on each of said truck frames, resilient means interconnecting said yoke member and the associated truck frame, and an inextensible resiliently compressible member interconnecting said yoke members.

2. In a railway vehicle, two spaced trucks each provided with a frame, a car body pivotally mounted on said trucks centrally thereof, a yoke member substantially centrally mounted on each of said truck frames and longitudinally slidable thereon, resilient means interposed between said yoke members and their associated truck frames adapted to resiliently urge said yoke members towards a central position on said truck frames, and means comprising inextensible, resiliently compressible elements directly interconnecting the yoke members of both trucks with each other for normally transmitting vehicle draft forces from one of said yokes to the other independently of said car body.

3. In a railway vehicle, two spaced trucks each provided with a frame, a car body pivotally mounted on said trucks centrally thereof, a yoke member substantially centrally mounted on each of said truck frames and longitudinally slidable thereon, resilient means interposed between said yoke members and their associated truck frames adapted to resiliently urge said yoke members towards a central position on said truck frames, and inextensible resiliently compressible means interconnecting the two yoke members.

4. In a railway vehicle, two spaced trucks each provided with a frame and a center bearing, a car body mounted on said center bearings, a yoke member centrally mounted on each of said truck frames and slidable longitudinally thereof, resilient means interposed between said yoke member and said truck frame, and means directly interconnecting the yoke members of the two trucks comprising a member movable with said yoke members and secured to each of said yoke members by universal joints, and a car coupling member pivotally secured to each of said yoke members.

5. In a railway vehicle, two spaced trucks each provided with a frame and a center bearing, a car body mounted on said center bearings, a yoke member slidably mounted on each of said truck frames and adapted to span said center bearing, resilient means interposed between said yoke member and a portion of said truck frame adapted to resiliently resist relative displacement thereof, a non-extensible resiliently compressible member pivotally secured to the adjacent portions of the two yoke members, and car coupling members pivotally secured to the opposite sides of said yoke members.

6. In a railway vehicle, two spaced trucks each provided with a frame and a center bearing, a car body mounted on said center bearings, a yoke member slidably mounted on each of said truck frames and adapted to surround in spaced relation said center bearing, resilient means interposed between said yoke member and a portion of said truck frame, means interconnecting the yoke members of the two trucks comprising end members pivotally secured to adjacent sides of said yoke members, an intermediate telescopable beam interconnecting said end members, spring means adapted to resiliently maintain said beam in its extended position, and car coupling means pivotally secured to the opposite sides of each of said yoke members.

7. In a railway vehicle, two spaced trucks each provided with a frame and a center bearing, a car body mounted on said center bearings, a yoke member slidably mounted on each of said truck frames and encompassing said center bearing, means interconnecting the adjacent portions of said yoke members, car coupling means secured to the opposite sides of said yoke members, resilient compressible means interposed between said yoke members and a portion of said truck frame, and a stop member mounted on said car body adjacent said center bearing in the path of movement of said yoke member relative to said truck frame, said stop member being so arranged as to be engaged by said yoke member only after said resilient compressible member has been compressed.

8. In a railway vehicle, two spaced trucks each provided with a frame and a center bearing, a car body mounted on said center bearings, a closed yoke member encompassing each of said center bearings and longitudinally slidably mounted on the associated truck frame, resilient compressible means interposed between said yoke members and adjacent portions of said truck frames adapted to resiliently resist relative displacement thereof, means for connecting said yoke members together comprising a pair of inextensibly connected members secured to both of said yoke members by ball and socket joints and having a resiliently compressible element acting therebetween, and a car coupling member secured to each of said yoke members by a ball and socket joint.

9. In a railway vehicle, two spaced trucks each provided with a frame and a laterally movable truck bolster, a center bearing mounted on each of said bolsters, a car body mounted on said center bearings, means for transmitting forces between adjacent vehicles and to the subject vehicle comprising a yoke member encompassing each of said center bearings and longitudinally movably mounted on the associated truck frame, a car coupling pivotally secured to each of said yoke members, an inextensible resiliently compressible beam pivotally secured to both of said yoke members, resilient compressible members adapted to oppose longitudinal movement of said yoke members with respect to their associated truck frames, and rigid means adapted to prevent excessive movement of said yoke members with respect to the car body towards the opposite truck.

10. In a railway vehicle, a plurality of spaced trucks, a car body supported on said trucks, and mechanism for transmitting vehicle draft forces to said vehicle and for normally transmitting said forces beyond the latter independently of said car body and said trucks and movable with respect to said car body and trucks, said mechanism comprising pivotally interconnected inextensible but contractible elements having a resiliently compressible member bearing therebetween, and resilient means mounted on each of said trucks in engagement with said mechanism and adapted to resiliently transmit forces from said mechanism to said trucks.

11. In a railway vehicle, two spaced trucks each provided with a frame and a center bearing, a car body mounted on said center bearings, a yoke member slidably mounted on each of said truck frames and adapted to span said center bearing, resilient compressible means interposed between each of said yoke members and a portion of the associated truck frame adapted to resiliently resist relative displacement thereof, a car coupling member secured to each of said yokes by means of a universal joint disposed adjacent the associated center bearing, and a member secured to both of said yoke members by means of universal joints disposed adjacent said center bearings.

WILLIAM VAN DER SLUYS.